US010684679B1

(12) United States Patent
Newman

(10) Patent No.: US 10,684,679 B1
(45) Date of Patent: Jun. 16, 2020

(54) SYSTEMS AND METHODS FOR GENERATING VIEWPOINTS FOR VISUAL CONTENT BASED ON GAZE

(71) Applicant: GOPRO, INC., San Mateo, CA (US)

(72) Inventor: David Newman, Del Mar, CA (US)

(73) Assignee: GoPro, Inc., San Mateo, CA (US)

(*) Notice: Subject to any disclaimer, the term of this patent is extended or adjusted under 35 U.S.C. 154(b) by 544 days.

(21) Appl. No.: 15/485,039

(22) Filed: Apr. 11, 2017

Related U.S. Application Data

(60) Provisional application No. 62/411,269, filed on Oct. 21, 2016.

(51) Int. Cl.
G06F 3/01 (2006.01)
G06K 9/00 (2006.01)
H04N 5/232 (2006.01)

(52) U.S. Cl.
CPC ......... *G06F 3/013* (2013.01); *G06K 9/00362* (2013.01); *G06K 9/00604* (2013.01); *G06K 9/00711* (2013.01); *H04N 5/23238* (2013.01)

(58) Field of Classification Search
CPC ........... G06F 3/013; G06K 9/00711; G06K 9/00362; G06K 9/00604; H04N 5/23238
See application file for complete search history.

(56) References Cited

U.S. PATENT DOCUMENTS

| | | | |
|---|---|---|---|
| 6,654,019 B2 | 11/2003 | Gilbert | |
| 8,022,948 B2 | 9/2011 | Garbow | |
| 8,194,002 B2 * | 6/2012 | Sanders-Reed | G01C 23/005 345/7 |
| 8,395,656 B1 * | 3/2013 | Malzbender | H04N 5/4403 348/14.08 |
| 9,363,569 B1 | 6/2016 | Van Hoff | |
| 2003/0160862 A1 | 8/2003 | Charlier | |
| 2003/0210327 A1 | 11/2003 | Mory | |
| 2004/0010804 A1 | 1/2004 | Hendricks | |
| 2004/0125133 A1 | 7/2004 | Pea | |
| 2009/0278917 A1 | 11/2009 | Dobbins | |

(Continued)

FOREIGN PATENT DOCUMENTS

| | | |
|---|---|---|
| WO | 2009047572 A1 | 4/2009 |
| WO | 2014090277 A1 | 6/2014 |

OTHER PUBLICATIONS

Kopf et al., "First-person Hyper-Lapse Videos" ACM Transactions on Graphics (Proceedings of SIGGRAPH 2014), 33(4), Article No. 78, 2014 (10 pages).

United States Office Action, U.S. Appl. No. 14/789,706, dated Jun. 7, 2016, ten pages.

O'Donovan, A., et al., "Real Time Capture of Audio Images and their Use with Video," 2007 IEEE Workshop on Applications of Signal Processing to Audio and Acoustics, Oct. 21-24, 2007, pp. 10-13.

(Continued)

*Primary Examiner* — Oschta I Montoya
(74) *Attorney, Agent, or Firm* — Esplin & Associates, PC

(57) ABSTRACT

Visual information defining visual content may be accessed. The visual content may include one or more views of one or more scenes. The scene(s) may include one or more human subjects. Gaze directions of the human subject(s) may be determined. The gaze directions may indicate one or more viewing directions in which the human subject(s) are looking. One or more directions of view for the visual content may be determined based on the gaze directions of the human subject(s). The direction(s) of view may include one or more of the viewing directions looked at by the human subject(s). The visual content may be presented on a display based on the direction(s) of view for the visual content.

14 Claims, 6 Drawing Sheets

(56) References Cited

U.S. PATENT DOCUMENTS

| | | | |
|---|---|---|---|
| 2010/0281375 | A1 | 11/2010 | Pendergast |
| 2010/0299630 | A1 | 11/2010 | McCutchen |
| 2011/0013778 | A1 | 1/2011 | Takumai |
| 2012/0206565 | A1 | 8/2012 | Villmer |
| 2013/0058535 | A1 | 3/2013 | Othmezouri |
| 2013/0177168 | A1 | 7/2013 | Inha |
| 2014/0039884 | A1 | 2/2014 | Chen |
| 2014/0344017 | A1* | 11/2014 | Deephanphongs ............ H04N 21/25866 705/7.29 |
| 2015/0264299 | A1* | 9/2015 | Leech .............. H04N 19/137 348/78 |
| 2017/0084086 | A1 | 3/2017 | Pio |
| 2017/0085964 | A1 | 3/2017 | Chen |

OTHER PUBLICATIONS

O'Donovan, A., et al., "Audio-Visual Panoramas and Spherical Audio Analysis using the Audio Camera," C1 Proceedings of the 16th International Conference on Auditory Display, Jun. 9-15, 2010, pp. ICAD-167-168, can be retrieved at <URL: https://smartech.gatech.edu/bitstream/handle/1853/49858/0%27DonovanDuraiswami201 O.pdf?sequence=1 >.

"Spatial Audio Lecture Series," Regents of the University of California at Berkeley, Center for New Music and Audio Technologies, 2015, 1 Page, [online] [retrieved on Aug. 20, 2015] Retrieved from the internet <URL:http:I/cnmat.berkelev.edu/spatialaudiolectures>.

PCT International Search Report and Written Opinion for PCT/US15/38913, dated Sep. 29, 2015, 15 Pages.

\* cited by examiner

SYSTEMS AND METHODS FOR GENERATING VIEWPOINTS FOR VISUAL CONTENT BASED ON GAZE

FIELD

This disclosure relates to systems and methods that generate viewpoints for visual content based on gaze.

BACKGROUND

For visual content (e.g., images, videos) including a greater content field of view than can normally be viewed within a single viewpoint, it may be difficult and time consuming to manually set viewpoints for the visual content. For example, different spherical images may include a thing/event of interest within different portions of the spherical images. Direction of a thing/event of interest captured within spherical videos may change during playback (due to movement of the thing/event and/or movement of the viewpoint). It may be difficult to manually set viewpoints for the visual content to be directed to/follow the thing/event of interest during view/playback.

SUMMARY

This disclosure relates to generating viewpoints for visual content based on gaze. Visual information defining visual content may be accessed. The visual content may include one or more views of one or more scenes. The scene(s) may include one or more human subjects. Gaze directions of the human subject(s) may be determined. The gaze directions may indicate one or more viewing directions in which the human subject(s) are looking. One or more directions of view for the visual content may be determined based on the gaze directions of the human subject(s). The direction(s) of view may include one or more of the viewing directions looked at by the human subject(s). The visual content may be presented on a display based on the direction(s) of view for the visual content.

A system that generates viewpoints for visual content may include one or more processors, and/or other components. The processor(s) may be configured by machine-readable instructions. Executing the machine-readable instructions may cause the processor(s) to facilitate generating viewpoints for visual content. The machine-readable instructions may include one or more computer program components. The computer program components may include one or more of a visual information component, a gaze direction component, a direction of view component, a presentation component, and/or other computer program components. In some implementations, the computer program components may include an extent of view component.

The visual information component may be configured to access visual information. The visual information may define visual content. Visual content may refer to media content that may be consumed visually. Visual content may include one or more of an image, a sequence of images, a frame of a video, a video having a progress length, and/or other visual content. Visual content may have been captured by one or more image sensors. Visual content may have been captured at a time or at different times. Visual content may have been captured at one or more locations. Visual content may include spherical visual content. Spherical visual content may include visual content obtained by a spherical capture. Spherical visual content may include 360 degrees or less than 360 degrees capture of visual content at one or more locations. Visual content may include one or more views of one or more scenes. One or more scenes may include one or more human subjects.

The gaze direction component may be configured to determine gaze directions of the one or more human subjects. The gaze directions may indicate one or more viewing directions in which the one or more human subjects within the scene(s) are looking. The gaze directions may be characterized by a yaw parameter, a pitch parameter, and/or other parameters. In some implementations, the gaze directions may be further characterized by a roll parameter.

The gaze directions may be determined based on visual analysis of the visual content and/or other information. In some implementations, determining the gaze directions may include determining one or more portions of the scene(s) viewed by the one or more human subjects. In some implementations, the gaze directions of the one or more human subjects may be determined as a function of progress through the video. For example, the gaze directions may include a first direction at a first point in the progress length of the video, a second direction at a second point in the progress length of the video, and/or other directions at other points in the progress length of the video.

The direction of view component may be configured to determine one or more directions of view for the visual content. In some implementations, the one or more directions of view for the visual content may be determined as a function of progress through the video. The one or more directions of view for the visual content may be determined based on the gaze directions of the one or more human subjects and/or other information. The one or more directions of view may include one or more of the viewing directions looked at by the one or more human subjects. In some implementations, two or more of the gaze directions may be weighed differently for determining the one or more directions of view for the visual content.

In some implementations, the one or more directions of view may be further determined based on the one or more portions of the scene(s) viewed by the one or more human subjects. In some implementations, determining the one or more directions of view may include determining one or more points of convergence based on the gaze directions. The one or more points of convergence may include one or more points within the scene(s) in which two or more of the gaze directions converge.

In some implementations, the extent of view component may be configured to determine one or more extents of view for the visual content. In some implementations, the one or more extents of view for the visual content may be determined as a function of progress through the video. The one or more extents of view for the visual content may be determined based on the gaze directions and/or other information.

The presentation component may be configured to present the visual content on a display. The visual content may be presented on the display based on the one or more directions of view for the visual content and/or other information. In some implementations, the visual content may be presented on the display further based on the one or more extents of view for the visual content. In some implementations, presenting the visual content based on the one or more directions of view for the visual content may include generating one or more versions of the visual content based on the one or more directions of view for the visual content and/or other information.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
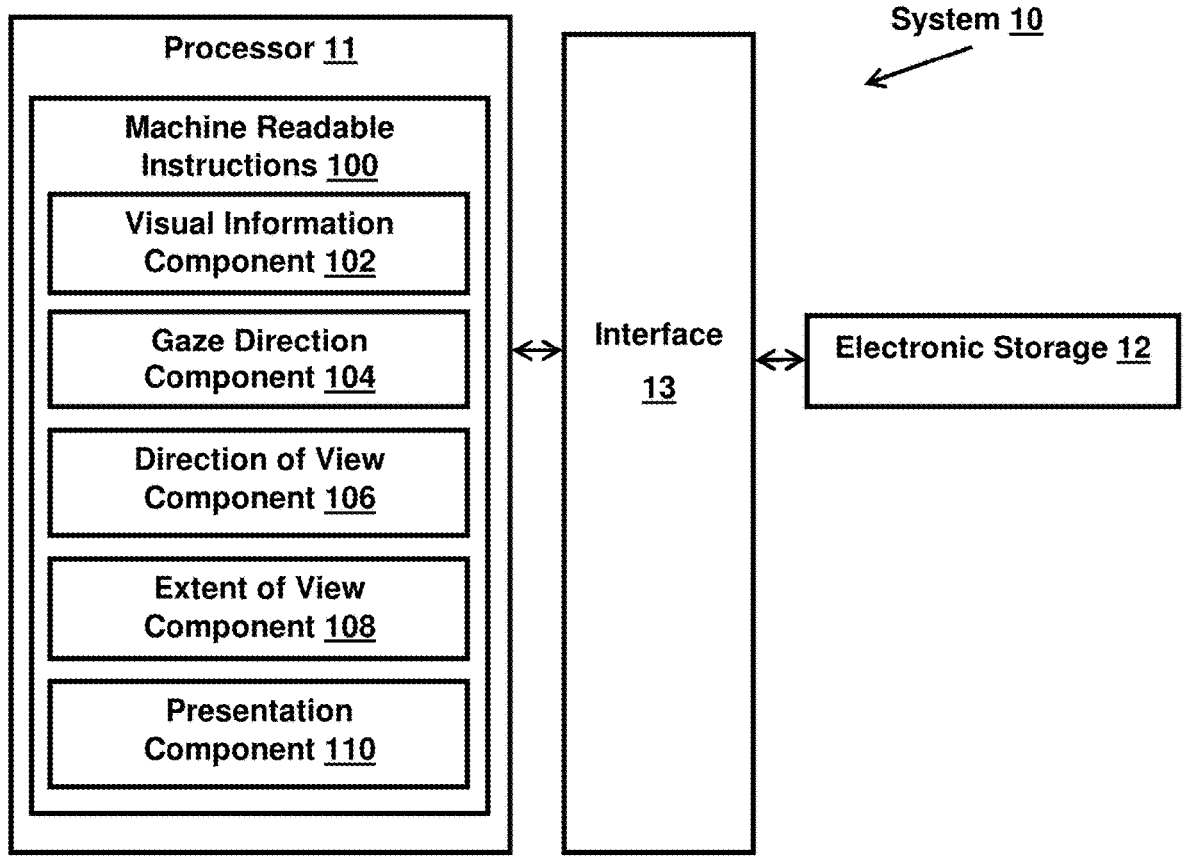
FIG. 1 illustrates a system that generates viewpoints for visual content based on gaze.

FIG. 1 illustrates system 10 for generating viewpoints for visual content based on gaze. System 10 may include one or more of processor 11, electronic storage 12, interface 13 (e.g., bus, wireless interface), and/or other components. Visual information defining visual content may be accessed by processor 11. The visual content may include one or more views of one or more scenes. The scene(s) may include one or more human subjects. Gaze directions of the human subject(s) may be determined. The gaze directions may indicate one or more viewing directions in which the human subject(s) are looking. One or more directions of view for the visual content may be determined based on the gaze directions of the human subject(s). The direction(s) of view may include one or more of the viewing directions looked at by the human subject(s). The visual content may be presented on a display based on the direction(s) of view for the visual content.

Electronic storage 12 may be configured to include electronic storage medium that electronically stores information. Electronic storage 12 may store software algorithms, information determined by processor 11, information received remotely, and/or other information that enables system 10 to function properly. For example, electronic storage 12 may store information relating to visual information, visual content, scenes included in the visual content, human subjects included in the visual content, gaze directions of human subjects, directions of view for the visual content, and/or other information.

Processor 11 may be configured to provide information processing capabilities in system 10. As such, processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. Processor 11 may be configured to execute one or more machine readable instructions 100 to facilitate generating viewpoints for visual content based on gaze. Machine readable instructions 100 may include one or more computer program components. Machine readable instructions 100 may include one or more of visual information component 102, gaze direction component 104, direction of view component 106, presentation component 110 and/or other computer program components. In some implementations, machine readable instructions 100 may include extent of view component 108.

The visual information component 102 may be configured to access visual information. The visual information may define one or more visual content. Visual content may include one or more views of one or more scenes. One or more scenes may include one or more human subjects. Visual information component 102 may access one or more visual information from one or more storage locations. A storage location may include electronic storage 12, electronic storage of one or more image sensors (not shown in FIG. 1), and/or other locations. Visual information component 102 may be configured to access visual information defining one or more visual content during acquisition of the visual content and/or after acquisition of the visual content by one or more image sensors. For example, visual information component 102 may access visual information defining a video while the video is being captured by one or more image sensors. Visual information component 102 may access visual information defining a video after the video has been captured and stored in memory (e.g., electronic storage 12).

Visual content may refer to media content that may be consumed visually. Visual content may include one or more of an image, a sequence of images, a frame of a video, a video having a progress length, and/or other visual content. Visual content may be stored in one or more formats/containers. Visual content may have been captured by one or more image sensors. Visual content may have been captured at a time or at different times. Visual content may have been captured at one or more locations. Visual content may include spherical visual content. Spherical visual content may include visual content obtained by a spherical capture. Spherical visual content may include 360 degrees or less than 360 degrees capture of visual content at one or more locations. Spherical visual content may be captured through the use of one or more image sensors to capture images/videos from one or more locations. The captured images/videos may be stitched together to form the spherical visual content.

Gaze direction component 104 may be configured to determine gaze directions of one or more human subjects. Gaze directions may indicate where things/events of interest are located within the visual content. Gaze directions may indicate one or more viewing directions in which one or more human subjects within the scene(s) are looking. Viewing directions may indicate which points/parts of the visual content are looked at by one or more human subjects within the scene(s).

Gaze directions may be characterized by a yaw parameter, a pitch parameter, and/or other parameters. In some implementations, the gaze directions may be further characterized by a roll parameter. A yaw parameter may define an amount of yaw rotation of gaze direction for visual content. A pitch parameter may define an amount of pitch rotation of gaze direction for visual content. A roll parameter may define an amount of roll rotation of gaze direction for visual content.

Figure 3:
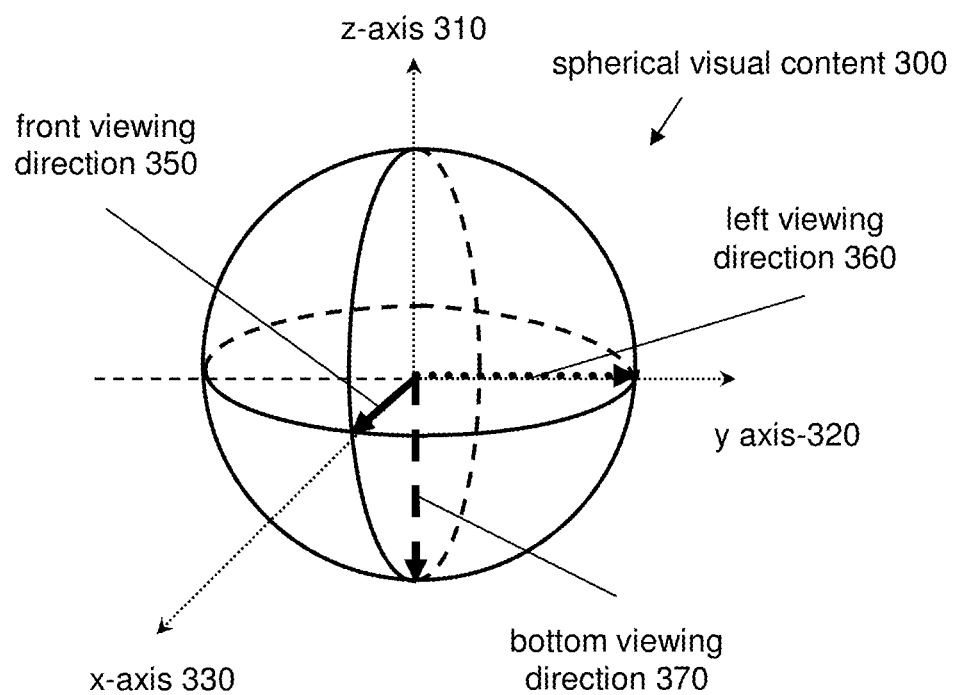
FIG. 3 illustrates exemplary rotational axes and viewing directions for visual content.

FIG. 3 illustrates examples of rotational axes for spherical visual content 300. Rotational axes for spherical visual content 300 may include z-axis 310, y-axis 320, x-axis 330, and/or other axes. A yaw parameter may define an amount of rotation of gaze direction for spherical visual content 300 around z-axis 310. A pitch parameter may define an amount of rotation of gaze direction for spherical visual content 300 around y-axis 320. A roll parameter may define an amount of rotation of gaze direction for spherical visual content 300 around a viewing direction.

For example, a 0-degree rotation around z-axis 310 and a 0-degree rotation around y-axis 320 of a gaze direction for spherical visual content 300 may correspond to front viewing direction 350. Front viewing direction 350 may indicate that a point/part of spherical visual content 300 located at 0-degree rotation of spherical visual content 300 around z-axis 310 and 0-degree rotation of spherical visual content 300 around y-axis 320 was looked at by one or more human subjects within a scene.

A −90-degree rotation of around z-axis 310 and a 0-degree rotation around y-axis 320 of a gaze direction for spherical visual content 300 may correspond to left viewing direction 360. Left viewing direction 360 may indicate that a point/part of spherical visual content 300 located at −90-degree rotation of spherical visual content 300 around z-axis 310 and 0-degree rotation of spherical visual content 300 around y-axis 320 was looked at by one or more human subjects within a scene.

A 0-degree rotation of around z-axis 310 and a −90-degree rotation around y-axis 320 of a gaze direction for spherical visual content 300 may correspond to bottom viewing direction 370. Bottom viewing direction 370 may indicate that a point/part of spherical visual content 300 located at 0-degree rotation of spherical visual content 300 around z-axis 310 and −90-degree rotation of spherical visual content 300 around y-axis 320 was looked at by one or more human subjects within a scene. Other viewing directions are contemplated.

While front viewing direction 350, left viewing direction 360, and bottom viewing direction 370 are shown as extending from center of spherical visual content 300, this is merely for ease of reference. Human subjects looking at one or more points/parts of spherical visual content 300 may or may not be located at the center of spherical capture of spherical visual content 300.

One or more viewing directions may be characterized by a roll parameter. For example, front viewing direction 350 may be characterized by a 45-degree of rotation about front viewing direction 350 based on one or more human subjects within a scene looking at the corresponding point/part of spherical visual content 300 with their heads tilted with respect to ground by 45-degrees. Other rotations of viewing directions are contemplated.

Gaze directions may be determined based on visual analysis of the visual content and/or other information. Gaze directions determination may be an extension of face detection. For example, gaze component 104 may determine gaze directions based on detecting faces/heads of humans subjects within a scene, determining orientations of faces/heads within the scene, and/or determining eye gazes within the scene. Gaze direction component 104 may use geometry of one or more image sensors capturing a scene to determine where one or more human subjects are looking within the visual content (e.g., spherical visual content 300). In some implementations, gaze directions may be determined based on a combination of iris eccentricity and head orientation. In some implementations, gaze direction component 104 may use information about human subjects to determine gaze directions. For example, gaze direction component 104 may access physical characteristic information (e.g., height, head shape, features of faces/head contour) of the human subjects in the scene to determine gaze directions of the human subjects.

In some implementations, determining the gaze directions may include determining one or more portions of the scene(s) viewed by one or more human subjects. For example, determining a gaze direction in front viewing direction 350 may include determining that a point/part of spherical visual content 300 located at 0-degree rotation of spherical visual content 300 around z-axis 310 and 0-degree rotation of spherical visual content 300 around y-axis 320 was looked at by one or more human subjects within a scene. Determining a gaze direction in left viewing direction 360 may include determining that a point/part of spherical visual content located at −90-degree rotation of spherical visual content 300 around z-axis 310 and 0-degree rotation of spherical visual content 300 around y-axis 320 was looked at by one or more human subjects within a scene. Determining a gaze direction in bottom viewing direction 370 may include determining that a point/part of spherical visual content located at 0-degree rotation of spherical visual content 300 around z-axis 310 and −90-degree rotation of spherical visual content 300 around y-axis 320 was looked at by one or more human subjects within a scene.

Figure 4:
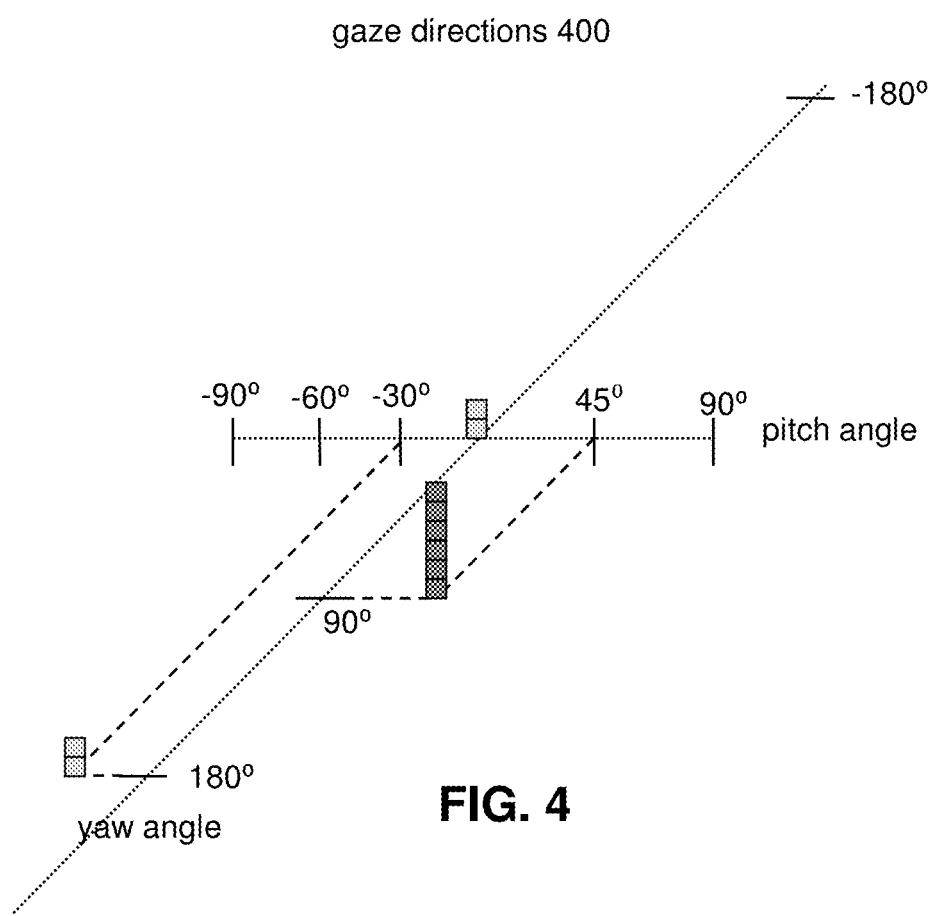
FIG. 4 illustrates exemplary gaze directions.

FIG. 4 illustrates exemplary gaze directions 400 of multiple human subjects for visual content. Gaze directions 400 may represent gaze directions of multiple human subjects an image or a frame of a video. Gaze directions 400 may include gaze directions of ten human subjects within a scene. As shown in FIG. 4, two human subjects may be looking at a point/part of the visual content located at 0-degree yaw angle and 0-degree pitch angle, two human subjects may be looking at a point/part of the visual content located at 180-degree yaw angle and −30-degree pitch angle, and six human subjects may be looking at a point/part of the visual content located at 90-degree yaw angle and 45-degree pitch angle. Other gaze directions are contemplated.

In some implementations, gaze directions of one or more human subjects may be determined as a function of progress through a video. Gaze directions may include a first direction at a first point in the progress length of the video, a second direction at a second point in the progress length of the video, and/or other directions at other points in the progress length of the video. For example, a video may include one or more views of a scene including a horse race and a human subject. The human subject's gaze may be following a particular horse in the horse race and the gaze direction of the human subject may change as a function of progress through the video based on the human subject's gaze following the horse.

Gaze direction component 104 may be configured to determine gaze directions of one or more human subjects during acquisition of the visual content and/or after acquisition of the visual content by one or more image sensors. For example, gaze direction component 104 may determine gaze directions for a video (e.g., for different frames of the video) while the video is being captured by one or more image sensors. Gaze direction component 104 may determine gaze directions for an image after the image has been captured and stored in memory (e.g., electronic storage 12). Gaze direction determined during and/or after capture may be stored as part of visual information corresponding to the visual content (e.g., metadata) and/or in other locations.

Direction of view component 106 may be configured to determine one or more directions of view for the visual content. A direction of view for the visual content may correspond to a direction of a viewing field of view within which the visual content may be viewed. A viewing field of view for the visual content may define one or more portions of the visual content to be presented on a display. Directions of view for the visual content may be characterized by a yaw parameter, a pitch parameter, and/or other parameters. In some implementations, directions of view for the visual content may be further characterized by a roll parameter.

Direction of view component 106 may determine one or more directions of view for the visual content based on the gaze directions of one or more human subjects and/or other information. One or more directions of view may include one or more of the viewing directions looked at by one or more human subjects. In some implementations, one or more directions of view may include one or more of the viewing directions most looked at by multiple human subjects. For example, based on gaze directions 400, direction of view component 106 may determine a direction of view for the visual content characterized by a 90-degree yaw angle and a 45-degree pitch angle. Determining directions of view based on the viewing directions most looked at by human subjects may allow the directions of view of visual content to include/follow the points/parts of the visual content most looked at by the human subjects.

Figure 5:
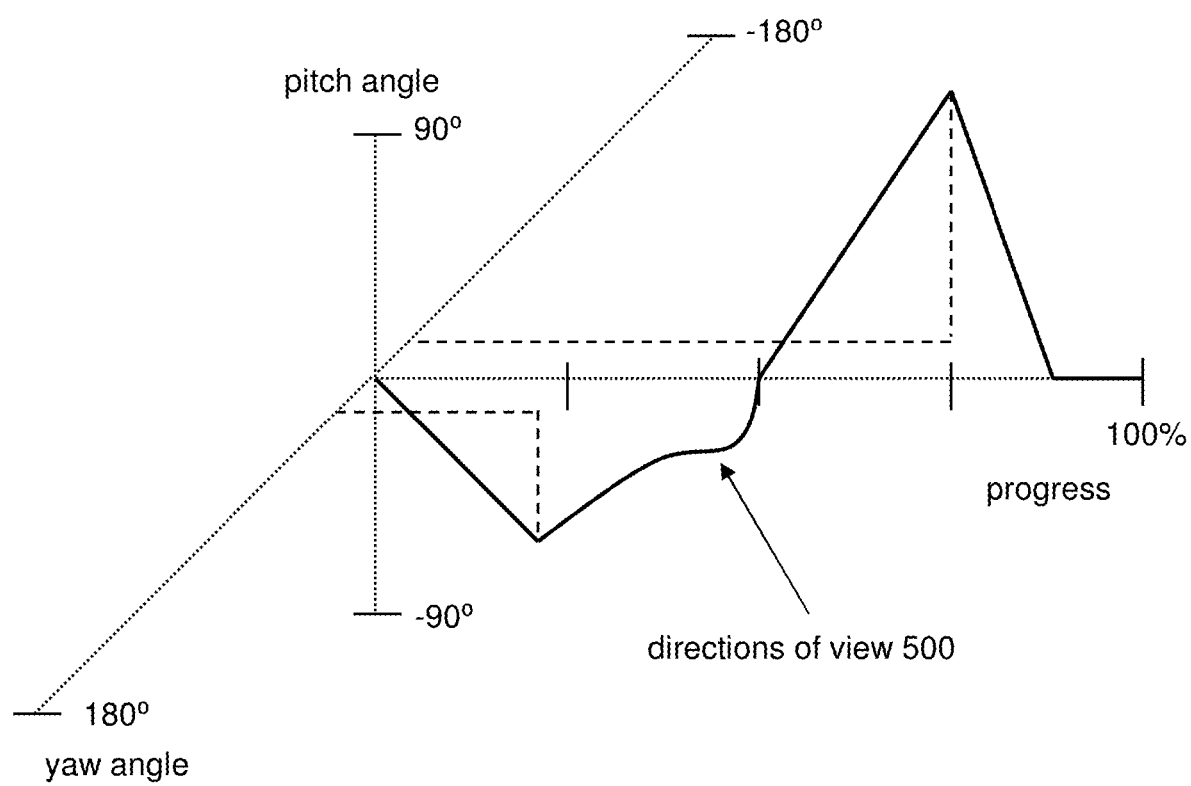
FIG. 5 illustrates exemplary directions of view.

In some implementations, one or more directions of view for the visual content may be determined as a function of progress through a video. FIG. 5 illustrates exemplary directions of view 500 for a video as a function of progress through the video. Directions of view 500 may correspond to and/or may be determined based on gaze directions of one or more human subjects and/or other information. Directions of view 500 may change as a function of progress through the video. For example, at 0% progress mark, directions of view 500 may be characterized by a zero-degree yaw angle and a zero-degree pitch angle. At 25% progress mark, directions of view 500 may be characterized by a positive yaw angle and a negative pitch angle. At 50% progress mark, directions of view 500 may be characterized by a zero-degree yaw angle and a zero-degree pitch angle. At 75% progress mark, directions of view 500 may be characterized by a negative yaw angle and a positive pitch angle. At 87.5% progress mark, directions of view 500 may be characterized by a zero-degree yaw angle and a zero-degree pitch angle.

In some implementations, one or more directions of view may be further determined based on one or more portions of the scene(s) viewed by one or more human subjects. One or more directions of view may be determined to include within the viewing field of view one or more portions of the scene(s) viewed by one or more human subjects. For example, based on gaze directions 400, one or more directions of view may be determined to include a portion of the scene located at a 90-degree yaw angle and a 45-degree pitch angle.

In some implementations, determining one or more directions of view may include determining one or more points of convergence based on the gaze directions. One or more points of convergence may include one or more points within the scene(s) in which two or more of the gaze directions converge. For example, determining one or more directions of view based on gaze direction 400 may include determining a point of convergence located at 0-degree yaw angle and 0-degree pitch angle (for two human subjects), a point of convergence located at 180-degree yaw angle and −30-degree pitch angle (for two human subjects), and a point of convergence located at 90-degree yaw angle and 45-degree pitch angle (for six human subjects). One or more directions of view may be determined to include one or more points of convergence.

In some implementations, two or more of the gaze directions may be weighed differently for determining one or more directions of view for the visual content. For example, gaze directions of human subjects may be given different weight based on the identity of the human subjects. Different weighing of gaze directions of the visual content based on identities may allow for the direction(s) of view to be determined based on/depend more/less on views of particular persons. For example, spherical visual content 300 may include a spherical capture (image or video) of a birthday party. The birthday person's gaze direction may be weighed more than other persons at the party (e.g., 2×, 5×, 100×). As another example, other persons' gaze directions may be given no weight and the birthday person's gaze direction may determine the direction(s) of view.

Gaze directions of human subjects may be given different weights based on the actions of the human subjects. Gaze directions of human subjects performing particular action(s) (e.g., shouting, jumping, pointing) may be weighed more than gaze directions of human subjects performing other actions (e.g., sitting/standing still). Particular actions may convey emotion/excitement/surprise of the human subjects. Different weighing of gaze directions of the visual content based on actions of human subjects may allow for the direction(s) of view to be determined based on/depend more on context of the scene. For example, spherical visual content 300 may include a spherical capture (image or video) of a football event. A touchdown by a team may cause one or more human subjects in the scene to jump up, raise their arms, shout, and/or provide other visual/audio clues as to what is happening within the scene. The gaze directions of humans subjects whose actions display more emotion/excitement/surprise may be weighed more so that the gaze direction is focused on the portion of spherical visual content 300 that caused the emotion/excitement/surprise.

In some implementations, one or more directions of view may precede one or more gaze directions. For example, at a particular point in the progress length of a video, a group of human subjects may quickly change their gaze directions to look at a particular point/part of the visual content. The rapid and/or collective changes of gaze directions may indicate that an event of interest just occurred at the particular point/part of the visual content. Direction of view component 106 may determine one or more directions of view for the visual content such that the direction of view is directed toward the particular point/part of the visual content before the particular point in the progress length, i.e., the direction of view is directed to where the humans subjects will look. Determining one or more directions of view that precede the gaze direction(s) may allow for the directions of view to be directed at a particular point/part of the visual content before occurrence(s) of event(s) of interest and allow for the viewing of more/entire event(s) of interest (e.g., from beginning to the end).

Figure 6:
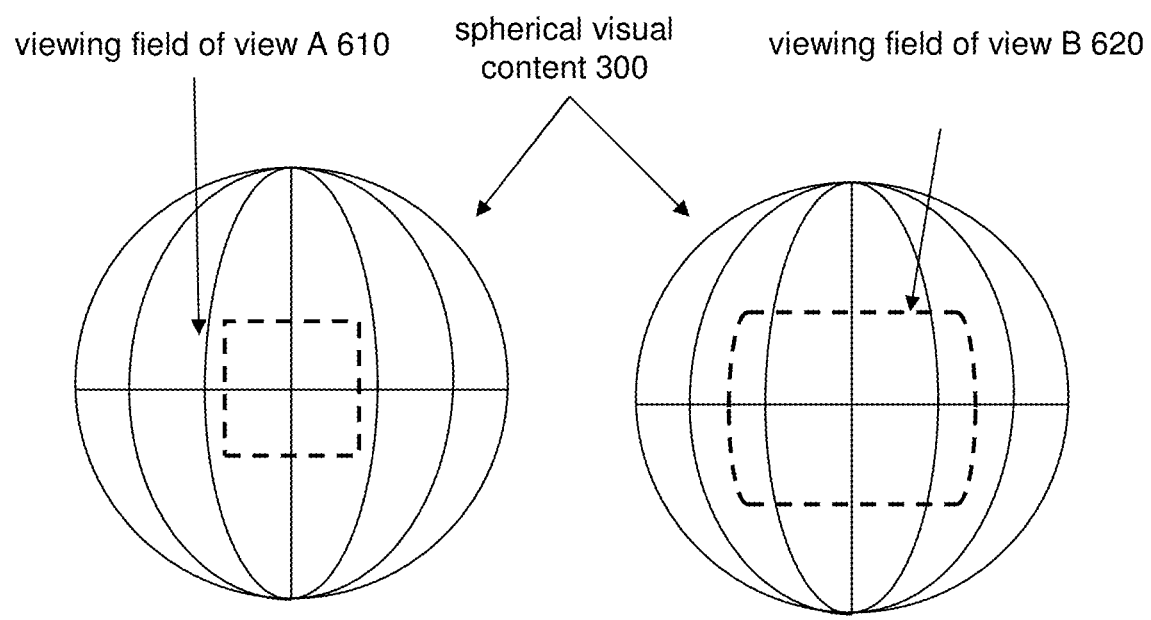
FIG. 6 illustrates exemplary viewing fields of view.

In some implementations, extent of view component 108 may be configured to determine one or more extents of view for the visual content. In some implementations, one or more extents of view for the visual content may be determined as a function of progress through the video. The extent of view for the visual content may correspond to sizes of viewing fields of view within which visual content may be viewed. Extents of view for the visual content may be characterized by one or more angles (e.g., horizontal angle, vertical angle, diagonal angle) and/or zooms (e.g., default zoom, 0.5× zoom, 3× zoom). FIG. 6 illustrates exemplary viewing field of view A 610 and viewing field of view B 620 with different extents of view. The extent of view for viewing field of view B 620 may be larger than the extent of view for viewing field of view A 610.

One or more extents of view for the visual content may be determined based on the gaze directions and/or other information. One or more extents of view may be determined to cover multiple gaze directions. For example, spherical visual content 300 may include a spherical capture of a music concert. Gaze directions of human subjects within the scene may be directed towards different members of a band on a stage. One or more extents of view may be determined to cover multiple/all member of the band such that a view of spherical visual content 300 using the extent(s) of view includes multiple/all member of the band.

In some implementations, one or more extents of view may be determined based on object/action detection within the visual content. For example, spherical visual content 300 may include a person performing a trick (e.g., jump) using a skateboard. The direction(s) of view following the person may be determined based on the gaze directions of human subjects observing the person. One or more extents of view for spherical visual content 300 may be determined such that a view of spherical visual content 300 using the extent(s) of view includes the entire person/entire trick.

Presentation component may 110 be configured to present the visual content on a display. The visual content may be presented on the display based on one or more directions of view for the visual content and/or other information. In some implementations, the visual content may be presented on the display further based on one or more extents of view for the visual content. The portions of the visual content presented on the display may be defined by the directions of view, the extents of view, and/or other information.

In some implementations, presenting the visual content based on one or more directions of view for the visual content may include generating one or more versions of the visual content based on one or more directions of view for the visual content and/or other information. For example, the directions of view for an image/a video content may be encoded into the image/the video and/or may be stored separately. Generating versions of the visual content based on one or more directions of view may allow a user to view the visual content using direction(s) of view. In some implementations, a user may deviate from the directions of view. For example, one or more directions of view may be used as a "default" view of the visual content and a user may change the directions of view during presentation of the visual content (e.g., via manual adjustment of the direction of view). In some implementations, the direction(s) of view may return to the "default" view when a user stops changing the direction(s) of view.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer readable storage medium may include read only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

Although processor 11 and electronic storage 12 are shown to be connected to interface 13 in FIG. 1, any communication medium may be used to facilitate interaction between any components of system 10. One or more components of system 10 may communicate with each other through hard-wired communication, wireless communication, or both. For example, one or more components of system 10 may communicate with each other through a network. For example, processor 11 may wirelessly communicate with electronic storage 12. By way of non-limiting example, wireless communication may include one or more of radio communication, Bluetooth communication, Wi-Fi communication, cellular communication, infrared communication, or other wireless communication. Other types of communications are contemplated by the present disclosure.

Although processor 11 is shown in FIG. 1 as a single entity, this is for illustrative purposes only. In some implementations, processor 11 may comprise a plurality of processing units. These processing units may be physically located within the same device, or processor 11 may represent processing functionality of a plurality of devices operating in coordination. Processor 11 may be configured to execute one or more components by software; hardware; firmware; some combination of software, hardware, and/or firmware; and/or other mechanisms for configuring processing capabilities on processor 11.

It should be appreciated that although computer components are illustrated in FIG. 1 as being co-located within a single processing unit, in implementations in which processor 11 comprises multiple processing units, one or more of computer program components may be located remotely from the other computer program components.

The description of the functionality provided by the different computer program components described herein is for illustrative purposes, and is not intended to be limiting, as any of computer program components may provide more or less functionality than is described. For example, one or more of computer program components 102, 104, 106, 108, and/or 110 may be eliminated, and some or all of its functionality may be provided by other computer program components. As another example, processor 11 may be configured to execute one or more additional computer program components that may perform some or all of the functionality attributed to one or more of computer program components 102, 104, 106, 108, and/or 110 described herein.

The electronic storage media of electronic storage 12 may be provided integrally (i.e., substantially non-removable) with one or more components of system 10 and/or removable storage that is connectable to one or more components of system 10 via, for example, a port (e.g., a USB port, a Firewire port, etc.) or a drive (e.g., a disk drive, etc.). Electronic storage 12 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. Electronic storage 12 may be a separate component within system 10, or electronic storage 12 may be provided integrally with one or more other components of system 10 (e.g., processor 11). Although electronic storage 12 is shown in FIG. 1 as a single entity, this is for illustrative purposes only. In some implementations, electronic storage 12 may comprise a plurality of storage units. These storage units may be physically located within the same device, or electronic storage 12 may represent storage functionality of a plurality of devices operating in coordination.

Figure 2:
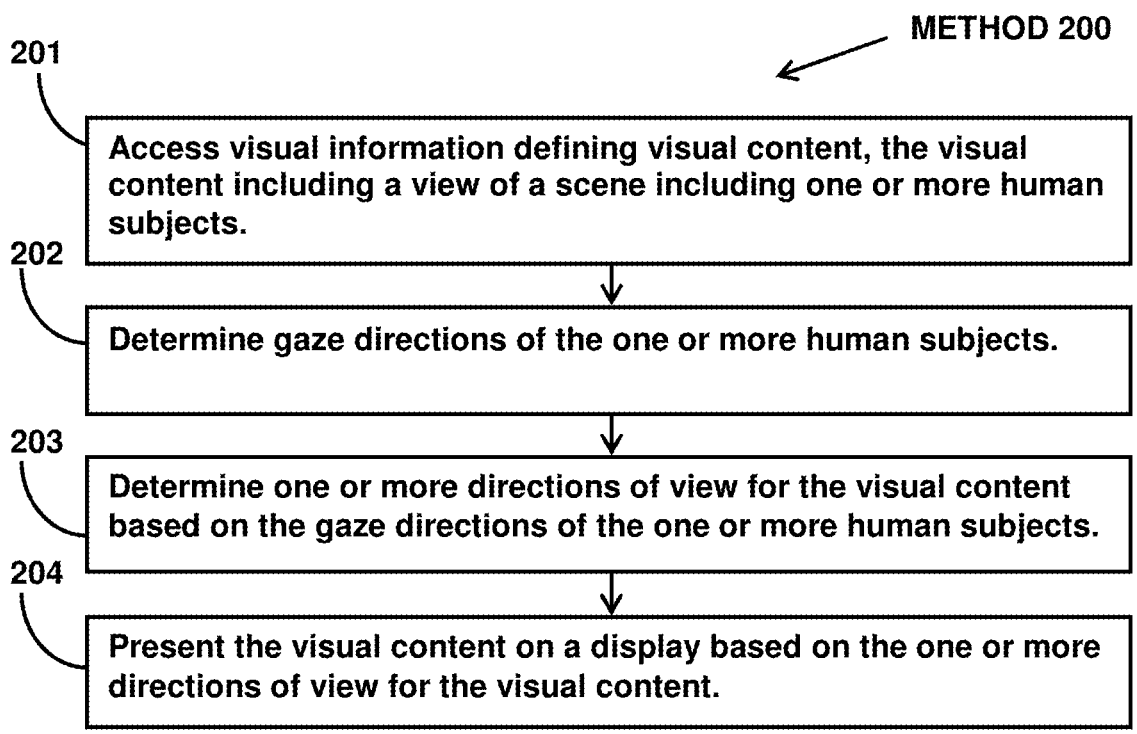
FIG. 2 illustrates a method for generating viewpoints for visual content based on gaze.

FIG. 2 illustrates method 200 for generating viewpoints for visual content. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operation of method 200.

Referring to FIG. 2 and method 200, at operation 201, visual information defining visual content may be accessed. The visual content may include a view of a scene including one or more human subjects. In some implementation, operation 201 may be performed by a processor component the same as or similar to visual information component 102 (Shown in FIG. 1 and described herein).

At operation 202, gaze directions of the one or more human subjects may be determined. The gaze directions may indicate one or more viewing directions in which one or more human subjects within the scene are looking. In some implementations, operation 202 may be performed by a processor component the same as or similar to gaze direction component 104 (Shown in FIG. 1 and described herein).

At operation 203, one or more directions of view for the visual content may be determined based on the gaze directions of the one or more human subjects. The one or more directions of view may include one or more of the viewing directions looked at by the one or more human subjects. In some implementations, operation 203 may be performed by a processor component the same as or similar to direction of view component 106 (Shown in FIG. 1 and described herein).

At operation 204, the visual content may be presented on a display based on the one or more directions of view for the visual content. In some implementations, operation 204 may be performed by a processor component the same as or similar to presentation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for generating viewpoints for visual content, the system comprising:
one or more physical processors configured by machine-readable instructions to:
access visual information defining spherical visual content, the spherical visual content including a spherical view of a scene including one or more human subjects;
determine gaze directions of the one or more human subjects within the spherical visual content, the gaze directions indicating one or more viewing directions in which the one or more human subjects within the scene are looking during capture of the spherical visual content;
determine one or more directions of view for the spherical visual content based on the gaze directions of the one or more human subjects within the spherical visual content, the one or more directions of view including one or more of the viewing directions looked at by the one or more human subjects within the spherical visual content, wherein two or more of the gaze directions are weighed differently for determining the one or more directions of view for the spherical visual content, wherein the two or more of the gaze directions are weighed differently based on actions of corresponding human subjects within the spherical visual content, wherein the two or more of the gaze directions include a first gaze direction and a second gaze direction, the actions of the corresponding human subjects within the spherical visual content include a first action of a first human subject corresponding to the first gaze direction and a second action of a second human subject corresponding to the second gaze direction, the first action conveying greater emotion, excitement, or surprise of respective human subjects than the second action, and gaze directions corresponding to greater emotion, excitement, or surprise is weighed more such that the first gaze direction is weighed more than the second gaze direction in determination of the one or more directions of view for the spherical visual content; and
present the spherical visual content on a display based on the one or more directions of view for the spherical visual content.

2. The system of claim 1, wherein:
the spherical visual content includes a spherical video having a progress length;
the gaze directions of the one or more human subjects within the spherical visual content are determined as a function of progress through the spherical video; and
the one or more directions of view for the spherical visual content are determined as the function of progress through the spherical video.

3. The system of claim 2, wherein the gaze directions include a first gaze direction at a first point within the progress length, the one or more directions of view include a first direction of view determined based on the first gaze direction, and the first direction of view is determined to precede the first gaze direction such that the first direction of view corresponds to a second point within the progress length, the second point preceding the first point within the progress length.

4. The system of claim 1, wherein:
  determining the gaze directions includes determining one or more portions of the scene viewed by the one or more human subjects within the spherical visual content during capture of the spherical visual content; and
  the one or more directions of view are further determined based on the one or more portions of the scene viewed by the one or more human subjects.

5. The system of claim 1, wherein the one or more human subjects within the spherical visual content include multiple human subjects, and determining the one or more directions of view includes determining one or more points of convergence based on the gaze directions, the one or more points of convergence including one or more points within the scene in which two or more of the gaze directions of two or more of the multiple human subjects within the spherical visual content converge.

6. The system of claim 1, wherein the one or more human subjects within the spherical visual content include multiple human subjects, and the one or more physical processors are further configured by machine-readable instructions to:
  determine an extent of view for the spherical visual content based on the gaze directions of the multiple human subjects, the gaze directions of the multiple human subjects directed toward different portions of the spherical visual content, the extent of view for the spherical visual content determined to cover the different portions of the spherical visual content corresponding to the gaze directions of the multiple human subjects; and
  present the spherical visual content on the display further based on the extent of view for the spherical visual content.

7. The system of claim 1, wherein the one or more physical processors are further configured by machine-readable instructions to:
  determine an extent of view for the spherical visual content based on the gaze directions of the first human subject, the gaze directions of the first human subject directed toward an object or an action captured within the spherical visual content, wherein the extent of view for the spherical visual content is determined further based on object detection or action detection such that the extent of view for the spherical visual content is determined to cover entirety of the object or the action captured within the spherical visual content; and
  present the spherical visual content on the display further based on the extent of view for the spherical visual content.

8. A method for generating viewpoints for visual content, the method comprising:
  accessing visual information defining spherical visual content, the spherical visual content including a view of a spherical scene including one or more human subjects;
  determining gaze directions of the one or more human subjects within the spherical visual content, the gaze directions indicating one or more viewing directions in which the one or more human subjects within the scene are looking during capture of the spherical visual content, wherein two or more of the gaze directions are weighed differently for determining the one or more directions of view for the spherical visual content, wherein the two or more of the gaze directions are weighed differently based on actions of corresponding human subjects within the spherical visual content, wherein the two or more of the gaze directions include a first gaze direction and a second gaze direction, the actions of the corresponding human subjects within the spherical visual content include a first action of a first human subject corresponding to the first gaze direction and a second action of a second human subject corresponding to the second gaze direction, the first action conveying greater emotion, excitement, or surprise of respective human subjects than the second action, and gaze directions corresponding to greater emotion, excitement, or surprise is weighed more such that the first gaze direction is weighed more than the second gaze direction in determination of the one or more directions of view for the spherical visual content;
  determining one or more directions of view for the spherical visual content based on the gaze directions of the one or more human subjects within the spherical visual content, the one or more directions of view including one or more of the viewing directions looked at by the one or more human subjects within the spherical visual content; and
  presenting the spherical visual content on a display based on the one or more directions of view for the spherical visual content.

9. The method of claim 8, wherein:
  the spherical visual content includes a spherical video having a progress length;
  the gaze directions of the one or more human subjects within the spherical visual content are determined as a function of progress through the spherical video; and
  the one or more directions of view for the spherical visual content are determined as the function of progress through the spherical video.

10. The method of claim 9, wherein the gaze directions include a first gaze direction at a first point within the progress length, the one or more directions of view include a first direction of view determined based on the first gaze direction, and the first direction of view is determined to precede the first gaze direction such that the first direction of view corresponds to a second point within the progress length, the second point preceding the first point within the progress length.

11. The method of claim 8, wherein:
  determining the gaze directions includes determining one or more portions of the scene viewed by the one or more human subjects within the spherical visual content during capture of the spherical visual content; and
  the one or more directions of view are further determined based on the one or more portions of the scene viewed by the one or more human subjects.

12. The method of claim 8, wherein the one or more human subjects within the spherical visual content include multiple human subjects, and determining the one or more directions of view includes determining one or more points of convergence based on the gaze directions, the one or more points of convergence including one or more points within the scene in which two or more of the gaze directions of two or more of the multiple human subjects within the spherical visual content converge.

13. The method of claim 8, wherein the one or more human subjects within the spherical visual content include multiple human subjects, the method further comprising:
  determining an extent of view for the spherical visual content based on the gaze directions of the multiple human subjects, the gaze directions of the multiple human subjects directed toward different portions of the spherical visual content, the extent of view for the spherical visual content determined to cover the different portions of the spherical visual content corresponding to the gaze directions of the multiple human subjects; and presenting the spherical visual content on the display further based on the extent of view for the spherical visual content.

14. The method of claim 8, the method further comprising:

determining an extent of view for the spherical visual content based on the gaze directions of the first human subject, the gaze directions of the first human subject directed toward an object or an action captured within the spherical visual content, wherein the extent of view for the spherical visual content is determined further based on object detection or action detection such that the extent of view for the spherical visual content is determined to cover entirety of the object or the action captured within the spherical visual content; and presenting the spherical visual content on the display further based on the extent of view for the spherical visual content.

\* \* \* \* \*